Dec. 21, 1926.

W. S. JOHNSON 1,611,453

FRONT AXLE SPINDLE FOR MOTOR VEHICLES

Filed April 10, 1924

INVENTOR:
Walter S. Johnson
BY
Pierre Barnes
ATTORNEY

Patented Dec. 21, 1926.

1,611,453

UNITED STATES PATENT OFFICE.

WALTER S. JOHNSON, OF SEATTLE, WASHINGTON.

FRONT-AXLE SPINDLE FOR MOTOR VEHICLES.

Application filed April 10, 1924. Serial No. 705,565.

This invention relates to improvements in front-axle spindles for motor vehicles.

The principal object of the invention generally is the provision of an axle spindle which will have the maximum shock resistance, be stronger, more durable, and otherwise more efficient than devices of this character hitherto in use. A more specific object of the invention is to provide an axle spindle composing a plurality of interfitting elements sleeved one within the other for the purpose of mutually supporting and reinforcing each other so that if either spindle element breaks the other element serves to carry the wheel which is journaled upon the spindle, which result is obtained by forming the spindle with a core having beveled shoulders adjacent its inner end, with their faces converging toward the axis of the core and placing a skein having inwardly extending arms over the core, the arms cooperating with the shoulders in absorbing and sustaining any sudden shock or stress upon the spindle.

By such devices, the danger of losing a wheel by reason of the spindle breaking off is obviated or, at least, reduced to a minimum as it is unlikely that the strains or stresses to which a spindle is subjected will cause both elements of a composite sleeved spindle to break simultaneously.

With the above and other objects in view the invention consists in the details of construction and in the arrangement and combination of parts hereinafter described and claimed.

In the accompanying drawing,—

Figure 1:
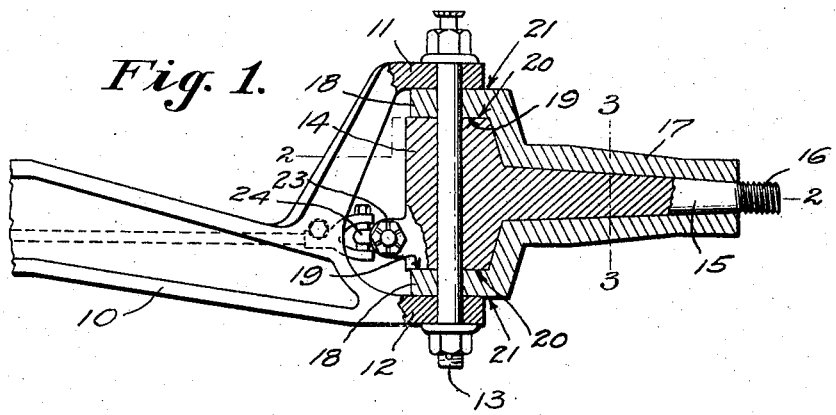
Figure 2:
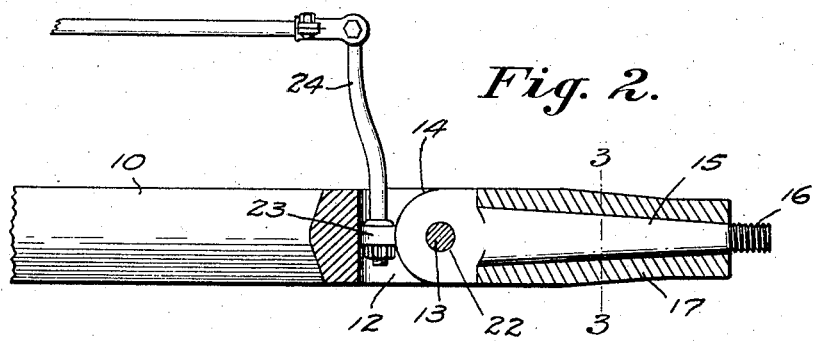
Figure 5:
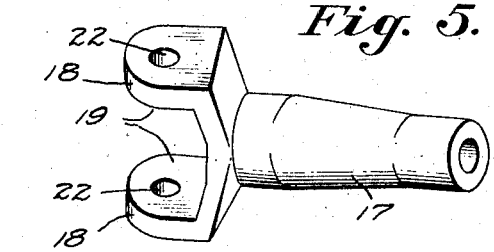
Figure 3:
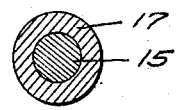
Figure 4:

Figure 1 is a view partly in front elevation and partly in vertical section of a portion of an axle with an embodiment of my improvements applied thereto. Fig. 2 is a horizontal section taken substantially on broken lines 2—2 of Fig. 1. Fig. 3 is a transverse sectional view on line 3—3 of Fig. 1. Fig. 4 is a sectional view similar to Fig. 3 to illustrate a modified construction of the spindle. Fig. 5 is a perspective view of the outer member, and Fig. 6 is a similar view of the inner member of a spindle constructed in accordance with my invention.

In said drawing, the reference numeral 10 represents the front axle of an automobile having its ends forked to provide arms 11 and 12. Extending vertically through apertures of said arms is a bolt 13 which constitutes the pivot pin for the wheel spindle.

Figure 6:
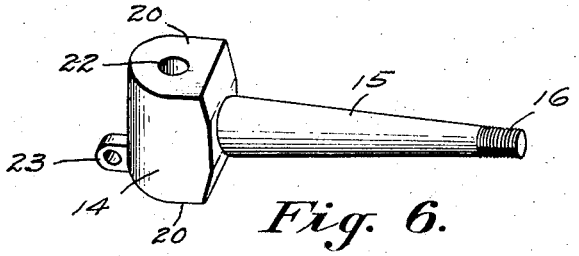

According to the present invention said spindle comprises an outer member and an inner member shown separately in Figs. 5 and 6 respectively.

Said inner member is formed to provide a knuckle element 14 having shoulders $14^a$ and from which extends a tapered stem 15 terminating in a threaded portion 16. The stem 15 may be of circular shape in transverse section as illustrated in Fig. 3, or of other suitable form as, for example, a fluted section as indicated by $15^1$ in Fig. 4.

The outer member of the spindle consists of a sleeve element 17 which is bored to make a tight fit upon the stem 15 and has at one of its ends offset portions $17^a$ adapted to engage shoulders $14^a$ and terminating in a pair of arm elements 18 which receive therebetween the knuckle element 14 of said inner member.

The inner surfaces 19 of the arms 18 are formed and arranged to fit against the opposing surfaces 20 of the knuckle element 14 of said inner member, and the outer surfaces 21 of the arms 18 to fit against the inner opposing surfaces of the axle arms 11 and 12.

The elements 14 and 18 constitute the knuckle of my improved spindle the same being bored as at 22 to receive the bolt 13 for pivotally connecting the spindle to the axle.

23 represents an apertured lug provided on the knuckle element 14 and to which is secured the arm 24 of the steering mechanism which may be of any usual or suitable type. The stem element 15 of the inner member fitting within the sleeve of the outer member and the arms 18 of the latter embracing the knuckle element 14 of the inner member unites the two members in a rigid structure which is supplemented by the bolt 13 which functions to couple the two members together.

The arrangement of the arms 18 of the outer member affords spaced engagements with the pivot bolt 13 to most effectually support the sleeve 17 which carries the journal of the associated wheel.

The knuckle element 14 of the inner member moreover most effectually supports the stem 15, the latter coacting with the sleeve 17 to mutually support or reinforce each other.

Under such conditions, the breaking or fracture due to crystallization, faulty material, excessive stresses, or otherwise, of either the inner or outer members alone will not render the device inoperative.

Spindles of the character referred to have heretofore been made of a single piece of metal and when broken by a sudden and extraordinary stress or strain, the cleavage will invariably be found to be through the spindle in, or approximately in, the same vertical plane as the inner face of the wheel hub. The invention provides for a spindle comprising a core having an enlarged portion or shoulder adjacent its inner end with beveled faces and a skein having arms projecting from its inner end encircling the core with the arms overlying the enlarged portion of the core and being secured thereto by pivot pin 13. This construction results in the skein absorbing the initial portion of the shock or stress placed upon the spindle before transmitting it to the core which in turn braces the skein. Furthermore, the skein having arms lying in the same vertical plane and embracing the outer beveled faces of the shoulders, the skein will act as a lever fulcrumed at the inner end of its lower arm, as at X transmitting a great portion of the shock or strain from a vertical to a horizontal plane, thus dissipating the downward or vertical thrust. In short, the skein functions as a cushion for the core.

What I claim is,—

1. The combination with an axle having a forked end, of a two-part spindle, comprising a member having a knuckle element and a stem element, a second member having a sleeve element mounted upon said stem and provided with a forked end to receive said knuckle element between the arms thereof, and a bolt extending through said knuckle, the forked end of the axle and the second named member for pivotally connecting the spindle to the axle.

2. A knuckle element having a spindle-like extension and a pivot bolt opening and a skein having a sleeve portion enclosing said spindle-like extension and provided with a portion having openings registering with said pivoted bolt openings whereby said skein may be retained in position by a pivoted bolt passed through said openings.

3. A spindle comprising a core having a reduced portion forming shoulders adjacent one of its ends and provided with a pivot bolt opening, a skein surrounding the reduced portion having arms abutting the shoulders and extending over and under the inner end of the core and provided with openings registering with said pivot bolt openings and a pivot bolt passing therethrough.

4. A two-part spindle comprising a knuckle element having a stem extending therefrom and a skein element surrounding the stem and provided with arms for engaging the knuckle to prevent rotation of the skein with relation to the stem.

5. A spindle of the character described comprising a knuckle element having a stem extending therefrom, a skein surrounding the stem and embracing the knuckle and a bolt passing through the knuckle element and the skein for pivotally securing the parts to the end of an axle.

6. In a spindle of the character described, a member having a knuckle element and a stem element, and a sleeve member mounted upon said knuckle element and a pivot bolt extending diametrically of the stem through said knuckle and sleeve member for securing said members together.

Signed at Seattle, Washington, this 11th day of March, 1924.

WALTER S. JOHNSON.